(12) United States Patent
Hayder et al.

(10) Patent No.: US 9,262,560 B2
(45) Date of Patent: Feb. 16, 2016

(54) AUTOMATIC RECOVERY OF RESERVOIR SIMULATION RUNS FROM PROCESSING SYSTEM FAILURES

(71) Applicant: Saudi Arabian Oil Company, Dhahran (SA)

(72) Inventors: M. Ehtesham Hayder, Dhahran (SA); Majdi A. Baddourah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 286 days.

(21) Appl. No.: 13/800,160

(22) Filed: Mar. 13, 2013

(65) Prior Publication Data

US 2014/0281743 A1 Sep. 18, 2014

(51) Int. Cl.
*G06F 17/50* (2006.01)
*G06F 11/30* (2006.01)
*E21B 49/00* (2006.01)

(52) U.S. Cl.
CPC ............ *G06F 17/5009* (2013.01); *E21B 49/00* (2013.01); *G06F 11/30* (2013.01); *G06F 2217/16* (2013.01)

(58) Field of Classification Search
CPC .. G06F 17/5009; G06F 11/30; G06F 2217/16
USPC .......................................................... 703/10
See application file for complete search history.

(56) References Cited

U.S. PATENT DOCUMENTS

| | | | |
|---|---|---|---|
| 7,526,418 B2 | 4/2009 | Pita et al. | |
| 7,571,089 B2 | 8/2009 | Franklin et al. | |
| 7,711,977 B2 | 5/2010 | Ballew et al. | |
| 8,103,910 B2 | 1/2012 | Blumrich et al. | |
| 8,250,405 B2 | 8/2012 | Elnozahy | |
| 2002/0138321 A1 | 9/2002 | Yuan et al. | |
| 2006/0036418 A1* | 2/2006 | Pita et al. | 703/10 |
| 2006/0095247 A1* | 5/2006 | O'Connell et al. | 703/22 |
| 2008/0126040 A1 | 5/2008 | Franklin et al. | |
| 2010/0017655 A1 | 1/2010 | Gooding et al. | |
| 2010/0088494 A1 | 4/2010 | Elnozahy | |
| 2010/0125443 A1* | 5/2010 | Abasov et al. | 703/22 |
| 2010/0217574 A1 | 8/2010 | Usadi et al. | |
| 2010/0318342 A1* | 12/2010 | Tamiya | 703/14 |
| 2011/0288831 A1* | 11/2011 | Tan et al. | 703/2 |

(Continued)

OTHER PUBLICATIONS

Joshua Hursey, "Coordinated Checkpoint / Restart Process Fault Tolerance for MPI Applications on HPC Systems", Jul. 2010, pp. 1-201, USA.

(Continued)

*Primary Examiner* — Dwin M Craig
(74) *Attorney, Agent, or Firm* — Bracewell & Giuliani LLP; Constance G. Rhebergen; Albert B. Kimball, Jr.

(57) ABSTRACT

Reservoir simulation is performed for giant reservoir models in a parallel computing platform composed of a number of processor nodes. Automatic precautionary checkpoints are made at regular time intervals when computational time exceeds a preset value. The simulator receives and reacts to signals from a real time monitoring interface tool which monitors the health of the system. Checkpoints are also made done if a system problem which may cause a simulation job to fail is projected. The simulation job is subsequently restarted to continue simulation from the last checkpoint. The monitoring and automatic recovery are done automatically without need for user intervention.

33 Claims, 6 Drawing Sheets

(56) References Cited

U.S. PATENT DOCUMENTS

2012/0059639 A1    3/2012    Fung et al.
2012/0136641 A1    5/2012    Fung et al.
2012/0210162 A1    8/2012    Gara et al.

OTHER PUBLICATIONS

Habiballah and Hayder, "Large Scale Parallel Reservoir Simulations on a Linux PC-Cluster", Linux Cluster Institute Conference, 2003, pp. 1-21, QuarterPower Media.

Martin L. Shooman, "Reliability of Computer Systems and Networks: Fault Tolerance, Analysis, and Design", 2002, pp. 1-546, A Wiley-Interscience Publication.

Schroeder and Gibson, "Understanding Failures in Petascale Computers", Journal of Physics, 2007, pp. 1-11, IOP Publishing.

Gibson et al., "Failure Tolerance in Petascale Computers", CTWatch Quarterly, Nov. 2007, pp. 1-8, www.pdsi-scidac.org/publications/papers/ctwatchquarterly1107.pdf.

Habiballah et al., "Parallel Reservoir Simulation Utilizing PC-Clusters" Saudi Aramco Journal of Technology, 2004, pp. 18-30.

Hayder et al., "Experiences in Setting up the Production Environment on PC Clusters for Reservoir Simulations at Saudi Aramco", 2004 SPE Technical Symposium of Saudi Arabia, May 15-17, 2004, pp. 1-12, SPE SA 29.

Hayder et al., "Challenges in High Performance Computing for Reservoir Simulation", EAGE Annual Conference & Exhibition incorporating SPE Europe held in Copenhagen, Denmark, Jun. 4-7, 2012, pp. 1-14, SPE152414.

Baddourah et al., "Application of High Performance Computing in Modeling Giant Fields of Saudi Arabia", 2011 SPE Saudi Arabia Section Technical Symposium and Exhibition, Al-Khobar, Saudi Arabia, 2011, pp. 1-8, SPE 149132.

Dogru et al., "A Next-Generation Parallel Reservoir Simulator for Giant Reservoirs", 2009 SPE Reservoir Simulation Symposium in the Woodlands Texas, Feb. 2-4, 2009, pp. 1-30, SPE119272.

Dogru et al., "New Frontiers in Large Scale Reservoir Simulation", SPE Reservoir Simulation Symposium held in the Woodlands, Texas, Feb. 21-23, 2011, pp. 1-12, SPE142297.

Dogru et al., "A Parallel Reservoir Simulator for Large-Scale Reservoir Simulation", SPE Reservoir Evaluation & Engineering, 2002, pp. 1-13, SPE75805.

International Search Report and Written Opinion for related PCT application PCT/US2014/022324 dated May 6, 2015.

\* cited by examiner

AUTOMATIC RECOVERY OF RESERVOIR SIMULATION RUNS FROM PROCESSING SYSTEM FAILURES

BACKGROUND OF THE INVENTION

1. Field of the Invention

The present invention relates to computerized simulation of what are known as giant reservoirs with automatic recovery from system failures in a parallel computing platform composed of a number of processor nodes.

2. Description of the Related Art

In the oil and gas industries, massive amounts of data are required to be processed for computerized simulation, modeling and analysis for exploration and production purposes. For example, the development of underground hydrocarbon reservoirs typically includes development and analysis of computer simulation models of the reservoir. These underground hydrocarbon reservoirs are typically complex rock formations which contain both a petroleum fluid mixture and water. The reservoir fluid content usually exists in two or more fluid phases. The petroleum mixture in reservoir fluids is produced by wells drilled into and completed in these rock formations.

A geologically realistic model of the reservoir, and the presence of its fluids, also helps in forecasting the optimal future oil and gas recovery from hydrocarbon reservoirs. Oil and gas companies have come to depend on geological models as an important tool to enhance the ability to exploit a petroleum reserve.

Reservoir simulators such as POWERS and GigaPOWERS have been described in the literature. See, for example articles by Dogru, A. H., et al.: "A Parallel Reservoir Simulator for Large-Scale Reservoir Simulation," SPE Reservoir Evaluation & Engineering Journal, pp. 11-23, 2002, by Dogru, A. H. et al., "A Next-Generation Parallel Reservoir Simulator for Giant Reservoirs," SPE 119272, proceedings of the 2009 SPE Reservoir Simulation Symposium, The Woodlands, Tex., USA, Feb. 2-4, 2009 and by Dogru, A. H., Fung, L. S., Middya, U., Al-Shaalan, T. M., Byer, T., Hoy, H., Hahn, W A., Al-Zamel, N., Pita, J., Hemanthkumar, K., Mezghani, M., Al-Mana, A., Tan, J, Dreiman, T., Fugl, A, Al-Baiz, A., "New Frontiers in Large Scale Reservoir Simulation," SPE142297, Proceedings of the 2011 SPE Reservoir Simulation Symposium, The Woodlands, Tex., USA, Feb. 21-23, 2011.

In simulation models, the reservoir is organized into a number of individual cells. Seismic data with increasing accuracy has permitted the cells to be on the order of 25 meters areal (x and y axis) intervals. For what are known as giant reservoirs, the number of cells is the least hundreds of millions, and reservoirs of what is known as giga-cell size (a billion cells or more) are encountered.

Figure 1:
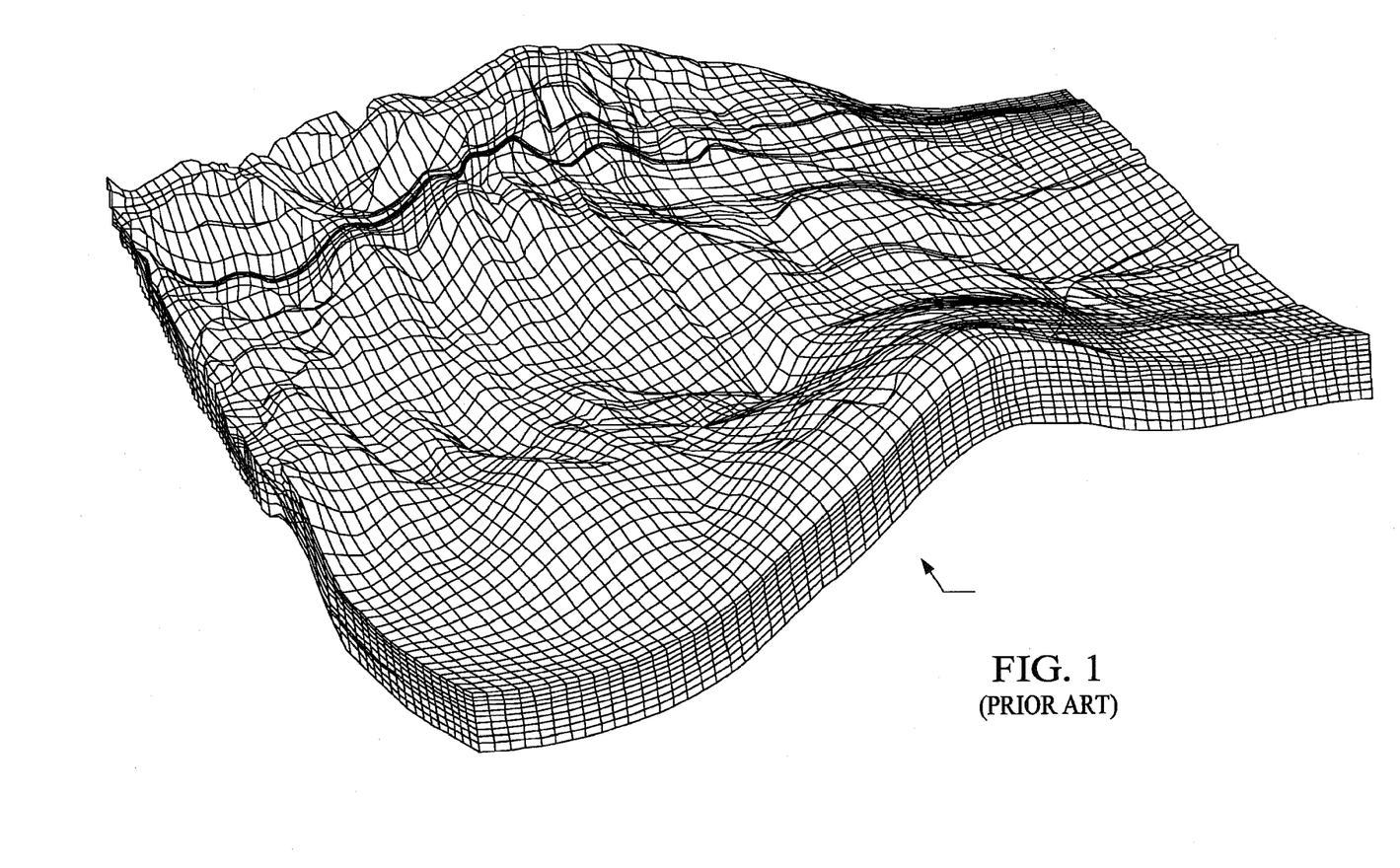
FIG. 1 is a schematic diagram of a model of a subsurface hydrocarbon reservoir.

An example reservoir of the type for which production data are simulated over the expected reservoir life as illustrated by the model M (FIG. 1) is usually one which is known to those in the art as a giant reservoir. A giant reservoir may be several miles in length, breadth and depth in its extent beneath the earth and might, for example, have a volume or size on the order of three hundred billion cubic feet.

Simulation of giant reservoir models is possible only on large computing platforms where simulation task is parallelized. In parallel computation, the simulation model is divided into many small partitions, and every partition is assigned to a specific computing element or processor node.

Giant reservoir simulation models have been built which required large computational resources. It typically has taken several days to complete a simulation. These simulations are done by high performance computing (HPC) computer clusters, which are groups of processor nodes. The processor nodes are available from several sources. During simulation of a giant reservoir, the reservoir model is decomposed or partitioned into a number of subdomains, and each of the processor nodes is assigned processing of a particular subdomain of cells of the reservoir model.

So far as is known, during reservoir simulation according to the prior art, a simulation engineer submitted the simulation job to the data processing system. The simulation engineer was then required to monitor the simulation job while it was being performed by monitoring progress of the job through the data processing system user interface.

It was possible that such reservoir simulation jobs could fail because of processing system problems. Failure of a single processor in the pool of processors responsible for computing a simulation job was likely to cause failure of the simulation job. In the event of a processing system problem in even a single processor node during a reservoir simulation, the entire simulation job would effectively be lost, and the time spent in the failed simulation was lost. The user was required to manually resubmit the simulation job which had been lost, and restart the simulation job from the beginning in most cases. Many simulation engineers lost significant amounts of productive time because of job failures on simulation clusters.

Processor failure rate have been observed on current high performance computing platforms to be about 0.2 failures per year per node. Such a processor failure rate translates into failure of many jobs which may be 1% or more simulation jobs per year. As more massive reservoir models are built, more nodes are required to be used for a simulation. In addition, simulation runs are projected to take longer time to finish for such reservoir models.

SUMMARY OF THE INVENTION

Briefly, the present invention provides a new and improved computer implemented method of reservoir simulation of a reservoir model partitioned into a plurality of subdomains composed of a plurality of reservoir cells in a data processing system. The computer performs the reservoir simulation, and during the reservoir simulation, generates a precautionary checkpoint output at regular time intervals when computational time exceeds a preset value. The method stores in memory an intermediate simulation output of reservation simulation in response to the generation of the precautionary checkpoint output, and monitors the status of the data processing system during the reservoir simulation to determine an operating status of the data processing system. If the monitored status of the data processing system indicates satisfactory operation, performing the reservoir simulation continues. If the monitored status of the data processing system indicates unsatisfactory operation, the reservoir simulation is stopped. The simulation input is modified based on the most recent stored intermediate simulation output before the unsatisfactory operating status was determined, and the simulation restarted based on the most recent intermediate simulation output.

The present invention also provides a new and improved data processing system performing a reservoir simulation of a reservoir model partitioned into a plurality of subdomains composed of a plurality of reservoir cells in a data processing system. The data processing system includes a processor which performing the reservoir simulation, and during the reservoir simulation, generating a precautionary checkpoint output at regular time intervals when computational time exceeds a preset value. The processor also stores in disk an intermediate simulation output of reservoir simulation in response to the generation of the precautionary checkpoint output. The processor also monitors the status of the data processing system during the reservoir simulation to determine an operating status of the data processing system. If the monitored status of the data processing system indicates satisfactory operation, the processor continues performing the reservoir simulation. If the monitored status of the data processing system indicates unsatisfactory operation, the processor stops the reservoir simulation and modifies the simulation input based on the most recent stored intermediate simulation output before the unsatisfactory operating status was determined. The processor then restarts the simulation based on the most recent intermediate simulation output.

The present invention also provides a new and improved data processing system performing a reservoir simulation of a reservoir model partitioned into a plurality of subdomains composed of a plurality of reservoir cells in a data processing system. The data processing system includes a compute engine performing the reservoir simulation and a memory storing data regarding the reservoir simulation. The data processing system also includes a monitoring interface which generates during the reservoir simulation a precautionary checkpoint output at regular time intervals when computational time exceeds a preset value. The monitoring interface further stores on a disk an intermediate simulation output of reservation simulation in response to the generation of the precautionary checkpoint output. The data processing system also includes a software agent monitoring the status of the data processing system during the reservoir simulation to determine an operating status of the data processing system. The monitoring interface, if the monitored status of the data processing system indicates unsatisfactory operation, stops the reservoir simulation. If the monitored status of the data processing system indicates unsatisfactory operation, the monitoring interface further modifies the simulation input based on the most recent stored intermediate simulation output before the unsatisfactory operating status was determined and restarts the reservoir simulation. The monitoring interface, if the monitored status of the data processing system indicates satisfactory operation, continues the reservoir simulation.

The present invention also provides a new and improved data storage device having stored in a computer readable medium computer operable instructions for a data processing system, in performing a reservoir simulation of a reservoir model partitioned into a plurality of subdomains composed of a plurality of reservoir cells, to cause a processor of the data processing system to perform the reservoir simulation. The instructions also, during the reservoir simulation, cause the processor to generate a precautionary checkpoint output at regular time intervals when computational time exceeds a preset value. The instructions also cause the processor to store in memory an intermediate simulation output of reservation simulation in response to the generation of the precautionary checkpoint output. The instructions also cause the processor to monitor the status of the data processing system during the reservoir simulation to determine an operating status of the data processing system. The instructions, if the monitored status of the data processing system indicates satisfactory operation, cause the processor to continue performing the reservoir simulation. If the monitored status of the data processing system indicates unsatisfactory operation, the instructions cause the processor to stop the reservoir simulation, modify the simulation input based on the most recent stored intermediate simulation output before the unsatisfactory operating status was determined, and restart the simulation based on the most recent intermediate simulation output.

DETAILED DESCRIPTION OF THE PREFERRED EMBODIMENTS

In the drawings, the letter M designates a simplified model of a portion of a subsurface hydrocarbon reservoir for which production results based on operating conditions and parameters are simulated over an estimated production life according to the present invention based on geological and fluid characterization information obtained for the cells of the reservoir. The results obtained are thus available and used for simulation of historical performance and for forecasting of production from the reservoir. Based on the results of such simulation, models such as those described and shown in U.S. Pat. No. 7,526,418 are then formed and are available for evaluation and analysis. U.S. Pat. No. 7,526,418 is owned by the assignee of the present invention and is incorporated herein by reference.

For a giant reservoir, the physical size of the reservoir may be many miles in length and have a volume or size on the order of a few thousand billion cubic feet. The number of cells for a reservoir of this size is, for example, typically on the order of hundreds of millions.

Figure 2:
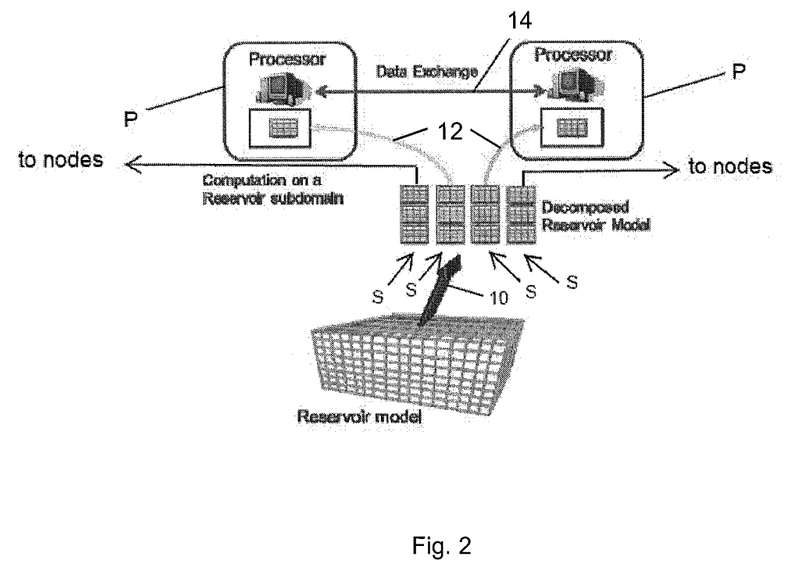
FIG. 2 is a schematic diagram of allocation of subdomains of a reservoir model of a subsurface hydrocarbon reservoir to processor nodes of a parallel computing platform.

Simulation of giant reservoir models is possible only on large computing platforms where simulation task is parallelized. FIG. 2 shows mapping of a simulation task for a model M like that of FIG. 1 onto a collection of processors P. Co-ordination of simulations among various computing elements are done through a communication library protocol, such as Message passing Interface (MPI), as will be described.

As shown in FIG. 2, a parallel computing platform or data processing system D has an allocation of available processor nodes P for reservoir simulation of the reservoir model M. Two processors are shown in FIG. 2, although it should be understood that an actual parallel computing platform includes significantly more such processor nodes.

As is conventional, the model M is decomposed as indicated by arrow 10 into a number of subdomains or partitions S. Each subdomain S is assigned to a specific individual processor node P, as indicated schematically by arrows 12. During the parallelized processing, the processors P interchange data and co-ordinate simulations by communications as indicated at 14. The communications between processors P are performed through suitable switching such as a switch W (FIG. 4) using a communication library protocol, for example MPI. It should be understood that other protocols could also be used for this purpose.

Figure 3:
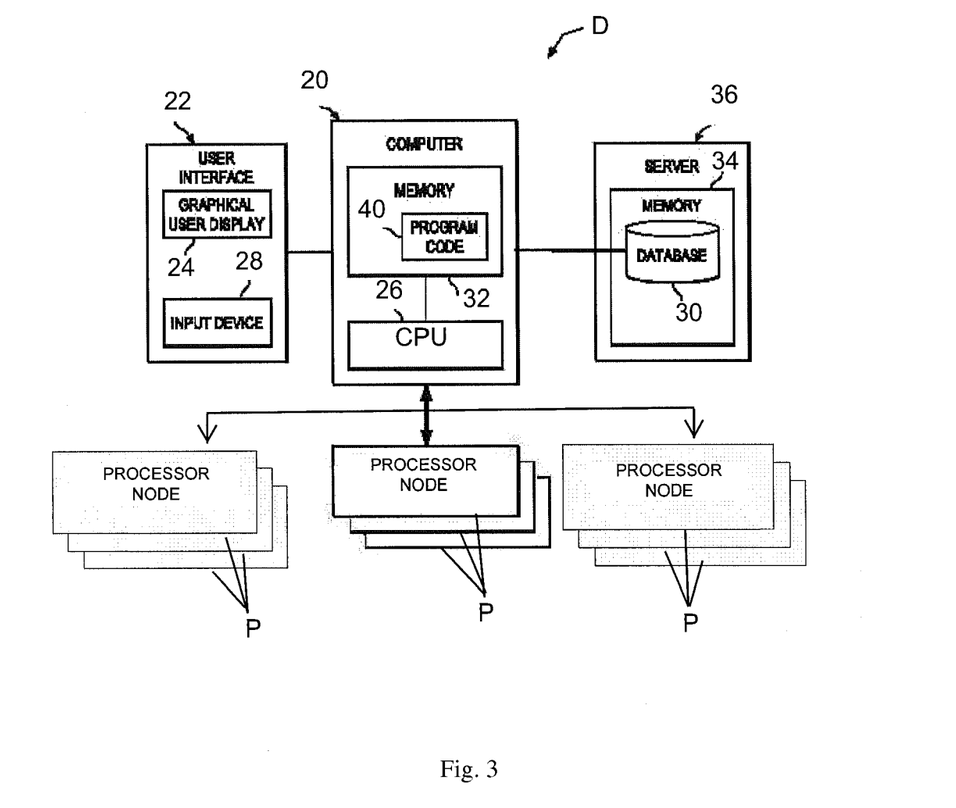
FIG. 3 is a schematic block diagram of a parallel computing platform data processing system for automatic recovery of reservoir simulation runs from system failures according to the present invention.

FIG. 3 illustrates a schematic diagram of an example of a data processing system D configured as a parallel computing platform with many processors connected by a suitable high speed network. It should be understood that the data processing system D may be a Linux cluster such as is available from HP Corporation or other source, or a computer multicore processor with nodes such as those from Intel Corporation or Advanced Micro Devices (AMD).

The data processing system D includes a computer 20 has a user interface 22 and an output data display 24 for displaying output data or records of the reservoir simulation. The output display 24 includes components such as a printer and an output display screen capable of providing printed output information or visible displays in the form of graphs, data sheets, graphical images, data plots and the like as output records or images. The computer 20 as indicated at 26 serves as a master node or CPU for the parallel computing performed during the reservoir simulation.

The user interface 22 of computer 20 also includes a suitable user input device or input/output control unit 28 to provide a user access to control or access information and database records and operate the computer 20. Data processing system D further includes a database 30 stored in computer memory, which may be internal memory 32 of computer 20, or an external, networked, or non-networked memory as indicated at 34 in an associated database server 36.

The data processing system D includes program code 40 stored in non-transitory form in memory 32 of the computer 20. The program code 40, according to the present invention is in the form of computer operable instructions causing the data processing system D to perform the reservoir simulation and also automatic recovery of reservoir simulation runs from processing system failures according to the present invention.

It should be noted that program code 40 may be in the form of microcode, programs, routines, or symbolic computer operable languages that provide a specific set of ordered operations that control the functioning of the data processing system D and direct its operation. The instructions of program code 40 may be may be stored in non-transitory form either in memory 32 of the computer 20, or on computer diskette, magnetic tape, conventional hard disk drive, electronic read-only memory, optical storage device, or other appropriate data storage device having a non-transitory computer usable medium stored thereon. Program code 40 may also be contained on a data storage device such as server 36 as a non-transitory computer readable medium, as shown.

The method of the present invention performed in the computer 20 can be implemented for automatic recovery of reservoir simulation runs from processing system failures utilizing the computer program steps stored in memory 32 and executable in a manner to be described below.

Figure 4:
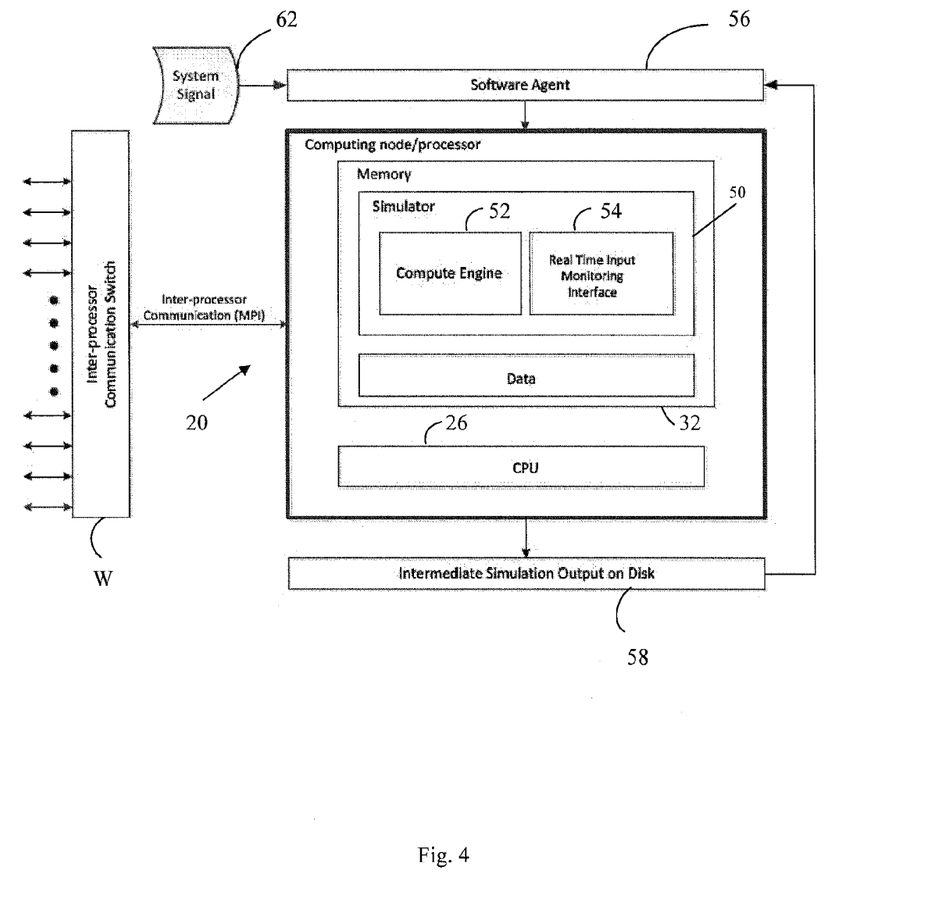
FIG. 4 is a schematic block diagram of a portion of the data processing system of FIG. 3.

FIG. 4 shows in more detail the organization of the computer 20 for automatic recovery of reservoir simulation runs from processing system failures according to the present invention. The memory 20 includes a simulator 50 which operates as a reservoir simulator such as the Powers or GIGA Powers simulators mentioned above. The simulator runs under control of a compute engine 52 which performs the reservoir simulation based on reservoir data in one or more of the data memories of the data processing system D. The memory 20 also includes a real time monitoring interface 54 (FIGS. 4-6) which provides interface for the simulator 50. A monitoring or software agent 56 (FIGS. 4-6) monitors the status of the simulation being performed in the associated processor P. The software agent 56 analyzes simulator intermediate output from the processor P and system signals as indicated at 62.

The simulator 50 periodically also generates automatic periodic precautionary checkpoint or restart output indicators at regular time intervals when computational time for processing by the data processing system on the simulation run reaches an established or specified checkpoint time value. When a periodic precautionary checkpoint is generated, an intermediate simulator output representing the data content of the reservoir simulation run at that particular time is stored in an external disk memory 58.

The checkpoint time value is determined based on historically known hardware failure probability intervals, the cost of check pointing and the loss/cost of simulation time in the case of hardware failure. Hardware failures are estimated from published vendor literature or from observations developed from actual usage experience. An example time would be, for example 1 to 2 hours. It should be understood that other set time intervals may also be used.

Figure 5:
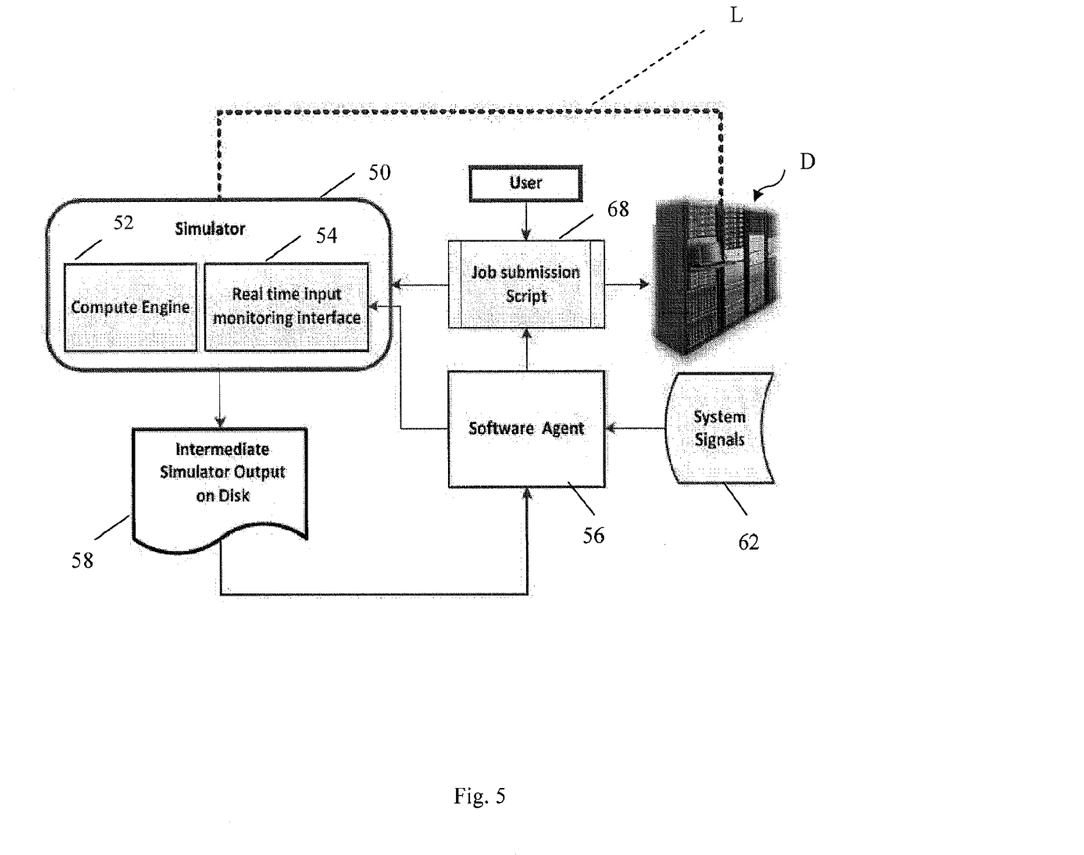
FIG. 5 is a functional block diagram of operation of the data processing system of FIG. 3.
Figure 6:
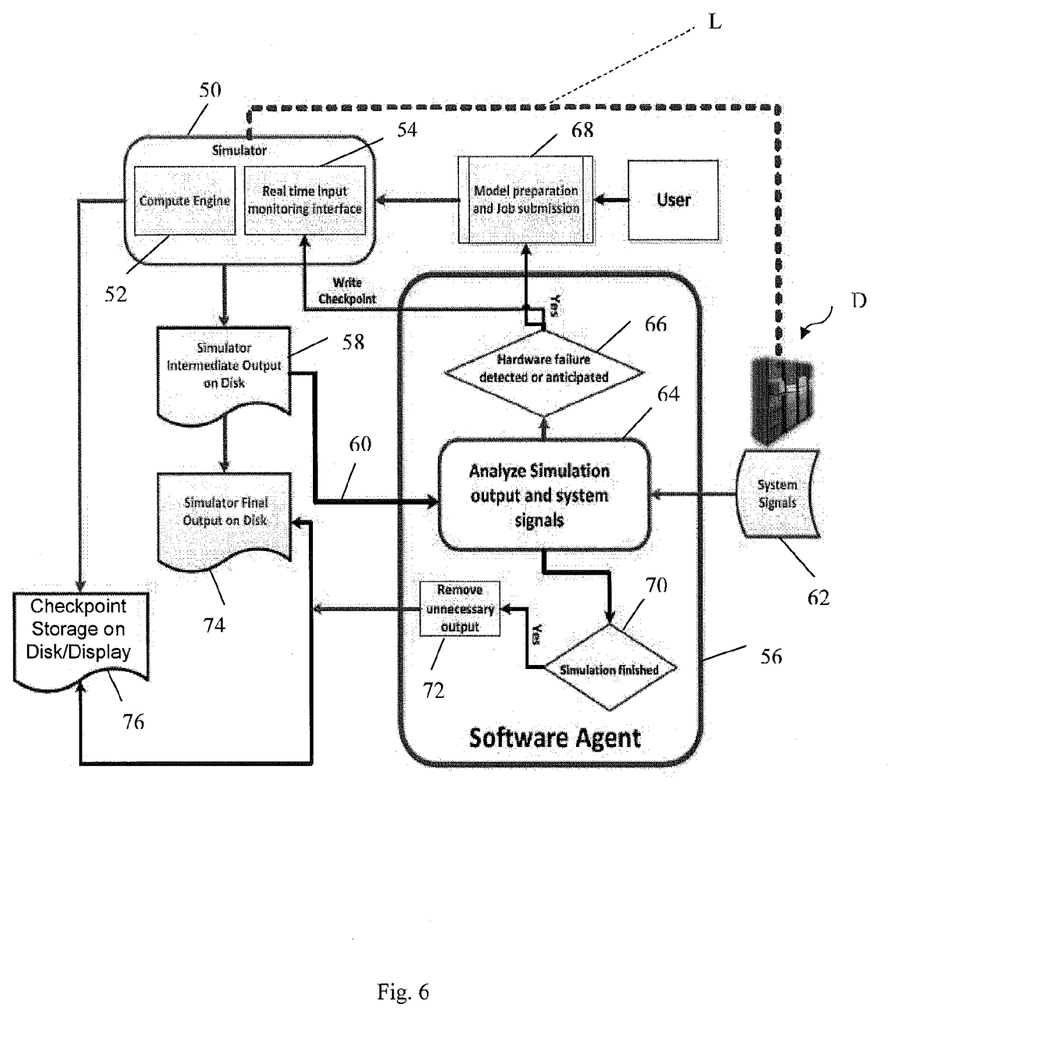
FIG. 6 is a functional block diagram of operation of the data processing system of FIG. 3.

Turning to FIGS. 5 and 6, the simulator 50 is shown performing the simulation on the data processing system D as indicated by a dashed line L. Periodically intermediate simulator outputs are stored on external disk memory 58. The software or monitoring agent 56 receives both the status of the simulation as indicated at 60 and system signals as indicated at 62 indicating the present operational status of the processor nodes of the data processing system D. As indicated at 64, the software agent 56 analyzes both the intermediate simulator output 60 and the system signals 62. As indicated at 66, if a hardware failure in the data processing system D is indicated, the simulator 50 generates a checkpoint restart which is sent to the real time monitoring interface 54 to stop the current simulation at its present state. The software agent 56 also as indicated at 68 restarts a new simulation, using the most recent intermediate simulator checkpoint output as a starting point.

Simulation in the foregoing manner illustrated in FIG. 4-6 continues until it is determined as indicated at 70 that the entire simulation run has been completed. As indicated at 72 unnecessary intermediate simulator checkpoint outputs which have been stored are then deleted from memory and the computed reservoir simulation final output is then transferred as indicated at 74 for storage as indicated at 76, preferably in disk 50 or alternatively in database 30. The stored reservoir simulation final output is then suitable for display as also indicated at 76.

The present invention thus provides the ability to restart the simulation using a checkpoint or restart output file. As discussed, the restart is made in response to a system signal indication an actual or impending data processing system hardware malfunction or failure. The starting point for the restart of the simulation run is the most recently stored intermediate simulator checkpoint data output. The most recently stored checkpoint data output file saves the detailed state of simulation at a particular time step, so that the simulation can be restarted from that particular time. The present invention thus provides a methodology to recover from a job run failure and automatically restart the computation without intervention by simulation engineers. The restart output files are generated at planned times during the simulation run when a system problem might be likely to occur and also when a present elapsed computation time is exceeded. The data processing system D according to the present invention thus permits inquiry regarding the status of system hardware and reception of signals from system monitoring tools and appropriate response by generating a restart output.

Thus, the present invention permits preservation and retention of the state and data content of a reservoir simulation process at specified time intervals, and also based on the observed state of current health of hardware/computing platform of data processing system D during simulation.

The present invention also provides automatic recovery (i.e., restart) of the simulation in the event of system failure from a checkpoint or restart output is generated. The data processing system of the present invention monitors progress of the simulation while performing the simulation and generates signals to warn the simulator about the system health or operating status. The data processing system D also restarts the reservoir simulation automatically from the last checkpoint or restart output without the need for any user intervention.

The present invention provides a mechanism for simulations to recover from such system failures automatically with very small overhead and loss in simulation time. The present invention also saves time and computation resources, since simulation jobs are restarted automatically when the system fails without the need of an intervention by simulation engineers, and further saves simulation time in the event of job failures.

From the foregoing, it can be seen that the present invention allows a reservoir simulator to automatically recover from a failed simulation due to hardware problems on a large parallel computing platform. The present invention provides a mechanism to anticipate system failure by monitoring system signals, generating appropriate checkpoint output and automatically restarting the reservoir simulation job without losing valuable simulation time. These actions are performed without the need of user intervention.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined processing methodology, or in the utilization of the results thereof, requires the claimed matter in the following claims; such modifications shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of recovering from data processing system failures during reservoir simulation of a reservoir model partitioned into a plurality of subdomains composed of a plurality of reservoir cells in a data processing system, the computer implemented method comprising the steps of:
   a) performing the reservoir simulation;
   b) during the reservoir simulation, generating a precautionary checkpoint output at regular time intervals when computational time exceeds a preset computational processing time value;
   c) storing in disk an intermediate simulation output of reservoir simulation in response to the generation of the precautionary checkpoint output;
   d) monitoring the status of the data processing system during the reservoir simulation to determine an operating status of the data processing system;
   e) if the monitored status of the data processing system indicates satisfactory operation, continuing the step of performing the reservoir simulation, and
   f) if the monitored status of the data processing system indicates unsatisfactory operation, stopping the reservoir simulation;
   g) modifying the simulation input based on the most recent stored intermediate simulation output before the unsatisfactory operating status was determined;
   h) restarting the simulation based on the most recent intermediate simulation output.

2. The computer implemented method of claim 1, further including the steps of:
   i) determining if the reservoir simulation is complete;
   j) storing the completed reservoir simulation; and
   k) forming an output display of the simulation results.

3. The computer implemented method of claim 2, further including the step of:
   deleting the stored intermediate simulation outputs of reservation simulation on completion of the reservoir simulation.

4. The computer implemented method of claim 1, wherein the data processing system comprises a computing platform composed of a plurality of processor clusters of processor nodes, each of the processor nodes being assigned a subdomain from the plurality of subdomains.

5. The computer implemented method of claim 1, wherein the step of monitoring the status of the data processing system during the reservoir simulation comprises the step of:
   monitoring the status of the data processing system for actual data processing system failures.

6. The computer implemented method of claim 1, wherein the step of monitoring the status of the data processing system during the reservoir simulation comprises the step of:
   monitoring the status of the data processing system for projected data processing system failures.

7. The computer implemented method of claim 1, wherein the preset computational processing time value for generating a precautionary checkpoint is based on computer hardware failure probability.

8. The computer implemented method of claim 1, wherein the step of monitoring the status of the data processing system comprises the step of:
   monitoring the status of the data processing system for processing system failures during the reservoir simulation to determine an operating status of the data processing system.

9. A data processing system performing a reservoir simulation of a reservoir model partitioned into a plurality of subdomains composed of a plurality of reservoir cells in a data processing system and recovering from data processing system failures during the reservoir simulation, the data processing system comprising:
   (a) a processor performing the steps of:
      (1) performing the reservoir simulation;
      (2) during the reservoir simulation, generating a precautionary checkpoint output at regular time intervals when computational time exceeds a preset computational processing time value;
      (3) storing in disk an intermediate simulation output of reservoir simulation in response to the generation of the precautionary checkpoint output;
      (4) monitoring the status of the data processing system during the reservoir simulation to determine an operating status of the data processing system;

(5) if the monitored status of the data processing system indicates satisfactory operation, continuing the step of performing the reservoir simulation, and (6) if the monitored status of the data processing system indicates unsatisfactory operation, stopping the reservoir simulation;

(7) modifying the simulation input based on the most recent stored intermediate simulation output before the unsatisfactory operating status was determined;

(8) restarting the simulation based on the most recent intermediate simulation output.

10. The data processing system of claim 9, wherein the processor further performs the steps of:
(9) determining if the reservoir simulation is complete;
(10) storing the completed reservoir simulation; and
(11) forming an output display of the simulation results.

11. The data processing system of claim 9, wherein the processor further performs the step of:
deleting the stored intermediate simulation outputs of reservation simulation on completion of the reservoir simulation.

12. The data processing system of claim 9, wherein the data processing system comprises a computing platform composed of a plurality of processor clusters of processor nodes, each of the processor nodes being assigned a subdomain from the plurality of subdomains, each of the processor nodes containing a processor performing the reservoir simulation of the assigned subdomain.

13. The data processing system of claim 9, wherein the processor in monitoring the status of the data processing system during the reservoir simulation performs the step of:
monitoring the status of the data processing system for actual data processing system failures.

14. The data processing system of claim 9, wherein the processor in monitoring the status of the data processing system during the reservoir simulation performs the step of:
monitoring the status of the data processing system for projected data processing system failures.

15. The data processing system of claim 9, wherein the processor in performing the step of monitoring the status of the data processing system performs the step of:
monitoring the status of the data processing system for processing system failures during the reservoir simulation to determine an operating status of the data processing system.

16. A data processing system performing a reservoir simulation of a reservoir model partitioned into a plurality of subdomains composed of a plurality of reservoir cells in a data processing system and recovering from data processing system failures during the reservoir simulation, the data processing system comprising:
a compute engine performing the reservoir simulation;
a memory storing data regarding the reservoir simulation;
a monitoring interface generating during the reservoir simulation a precautionary checkpoint output at regular time intervals when computational time exceeds a preset computational processing time value;
the monitoring interface further storing in the memory an intermediate simulation output of reservation simulation in response to the generation of the precautionary checkpoint output;
a software agent monitoring the status of the data processing system during the reservoir simulation to determine an operating status of the data processing system;
the monitoring interface, if the monitored status of the data processing system indicates unsatisfactory operation, stopping the reservoir simulation;
the monitoring interface, if the monitored status of the data processing system indicates unsatisfactory operation, further modifying the simulation input based on the most recent stored intermediate simulation output before the unsatisfactory operating status was determined and restarts the reservoir simulation, and
the monitoring interface, if the monitored status of the data processing system indicates satisfactory operation, continuing the reservoir simulation.

17. The data processing system of claim 16, further including a processor performing the steps of:
(a) determining if the reservoir simulation is complete;
(b) storing the completed reservoir simulation; and
(c) forming an output display of the simulation results.

18. The data processing system of claim 17, wherein the processor further performs the step of:
deleting the stored intermediate simulation outputs of reservation simulation on completion of the reservoir simulation.

19. The data processing system of claim 16, wherein the data processing system further comprises a computing platform composed of a plurality of processor clusters of processor nodes, each of the processor nodes being assigned a subdomain from the plurality of subdomains, each of the processor nodes containing a processor performing the reservoir simulation of the assigned subdomain.

20. The data processing system of claim 16, wherein the software agent in monitoring the status of the data processing system during the reservoir simulation performs the step of:
monitoring the status of the data processing system for actual data processing system failures.

21. The data processing system of claim 16, wherein the software agent in monitoring the status of the data processing system during the reservoir simulation performs the step of:
monitoring the status of the data processing system for projected data processing system failures.

22. The data processing system of claim 16, wherein the reservoir simulation is a simulation of a reservoir model partitioned into a plurality of subdomains composed of a plurality of reservoir cells.

23. The data processing system of claim 16, wherein the preset computational processing time value for generating a precautionary checkpoint is based on computer hardware failure probability.

24. The data processing system of claim 16, wherein the software agent monitoring the status of the data processing system monitors the status of the data processing system for processing system failures.

25. A non-transitory computer readable storage medium, containing computer executable instructions, that when executed cause a computer to perform the following method comprising:
(a) performing a reservoir simulation;
(b) during the reservoir simulation, generating a precautionary checkpoint output at regular time intervals when computational time exceeds a preset computational processing time value;
(c) storing in memory an intermediate simulation output of reservation simulation in response to the generation of the precautionary checkpoint output;
(d) monitoring the status of the computer during the reservoir simulation to determine an operating status of the computer;
(e) if the monitored status of the computer indicates satisfactory operation, continuing the step of performing the reservoir simulation, and (f) if the monitored status of the computer indicates unsatisfactory operation, stopping the reservoir simulation;

(g) modifying the simulation input based on the most recent stored intermediate simulation output before the unsatisfactory operating status was determined;

(h) restarting the simulation based on the most recent intermediate simulation output to recover from unsatisfactory status during the reservoir simulation.

26. The non-transitory computer readable storage medium containing computer executable instructions of claim 25, wherein the computer executable instructions further include the following steps:

(i) determining if the reservoir simulation is complete;

(j) storing the completed reservoir simulation; and (k) forming an output display of the simulation results.

27. The non-transitory computer readable storage medium containing computer executable instructions of claim 26, wherein the computer executable instructions further include instructions the following step:

deleting the stored intermediate simulation outputs of reservation simulation on completion of the reservoir simulation.

28. The non-transitory computer readable storage medium containing computer executable instructions of claim 25, wherein the computer comprises a computing platform composed of a plurality of processor clusters of processor nodes, each of the processor nodes being assigned a subdomain from the plurality of subdomains.

29. The non-transitory computer readable storage medium containing computer executable instructions of claim 25, wherein the computer executable instructions for the step of monitoring the status of the computer comprise instructions to perform the step of:

monitoring the status of the computer for actual computer failures.

30. The non-transitory computer readable storage medium containing computer executable instructions of claim 25, wherein the computer executable instructions for the step of monitoring the status of the computer comprise instructions for performing the step of:

monitoring the status of the computer for projected computer system failures.

31. The data storage device of claim 25, wherein the reservoir stimulation is a stimulation of a reservoir model partitioned into a plurality of subdomains composed of a plurality of reservoir cells.

32. The non-transitory computer readable storage medium containing computer executable instructions of claim 25, wherein the preset computational processing time value for generating a precautionary checkpoint is based on computer hardware failure probability.

33. The non-transitory computer readable storage medium containing computer executable instructions of claim 25, wherein the computer executable instructions for the step of monitoring the status of the computer comprise instructions for performing the step of:

monitoring the status of the computer for computer system failures.

* * * * *